March 15, 1960
J. J. C. HARDENBERG
2,928,324
X-RAY PHOTOGRAPHY DEVICE
Filed Nov. 9, 1953
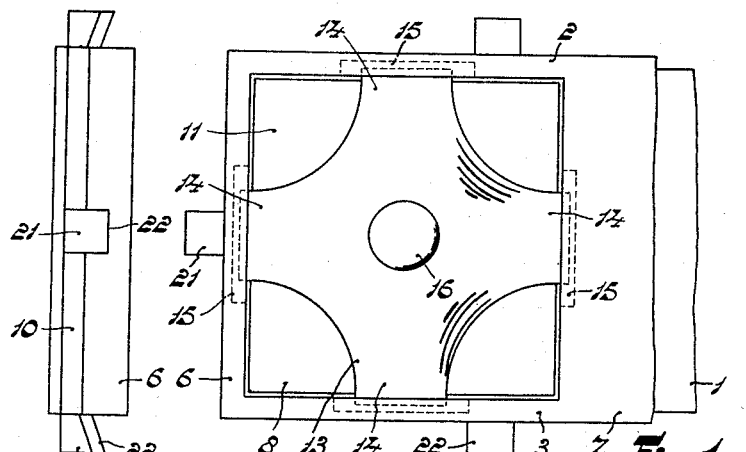
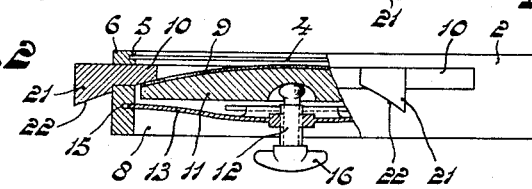
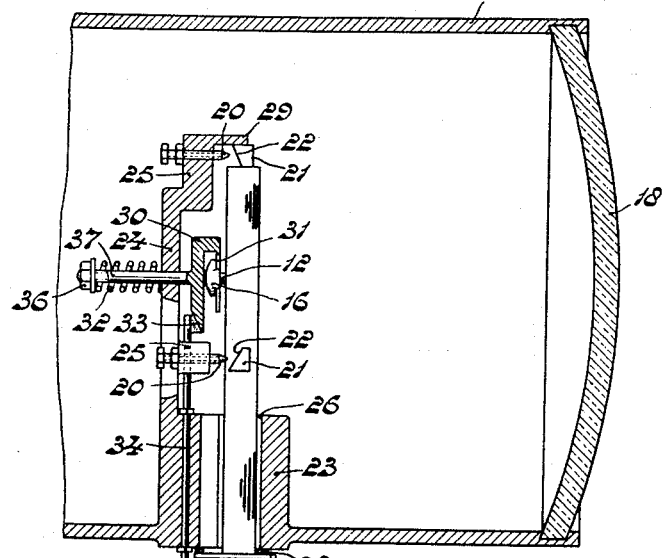
INVENTOR.
JAN J. C. HARDENBERG
BY
AGENT

United States Patent Office 2,928,324
Patented Mar. 15, 1960

2,928,324
X-RAY PHOTOGRAPHY DEVICE

Jan Jesayas Christiaan Hardenberg, Eindhoven, Netherlands, assignor, by mesne assignments, to North American Philips Company, Inc., New York, N.Y., a corporation of Delaware Application November 9, 1953, Serial No. 390,953

Claims priority, application Netherlands November 12, 1952

3 Claims. (Cl. 95—11)

This invention relates to X-ray photography devices and more particularly to X-ray devices having an optical mirror system.

In X-ray cameras comprising an optical mirror system of the kind used for X-ray medical examination, use is made in certain cases of a cessette which can be moved into the image beam and out of it at right angles to the optical axis and which contains the photo-sensitive plate or film for taking a single photograph. The sensitive material is to be replaced after each photograph, so that the cessette is required to be moved into the image beam and out of it an equal number of times. According to the invention and in order to avoid that the cassette after having been in use for some time may no longer occupy the correct position as a result of wear and tear of the points of friction, the cassette moved into the image beam is slidable in the direction of the optical axis and occupies the position intended for taking a photograph due to adapting surfaces provided on the cassette being urged against fixed points of support.

Apart from errors due to wear, which cause variation in the distance between the sensitive layer and the mirror, the orientation of the cassette with respect to fixed points of support also permits of neutralizing errors which occur upon moving the cassette into the image beam due to the cassette being introduced not far enough or too far so that the optical axis of the mirror does not strike the center of the field intended for the image. Even if provision is made of an abutment to prevent the cassette from being introduced too far, the risk remains that the optical axis and the axis passing through the center of the image field may be located in juxtaposition. A deviation which obviously is small is found to be already very troublesome when use is made of an optical mirror system, the image plane of which is spherical. The image layer is required to be adjusted with respect to the image plane with utmost accuracy. According to a further feature of the invention, this is achieved by using a three-point support for the cassette and the adapting surfaces are extensions either in the spherical image plane of the optical mirror or in a plane which is concentrical therewith. This particular shape of the adapting surfaces ensures that the cassette, after it has been moved into the space governed by the image beam and engages with its adapting surfaces the points of support is so arranged that the image layer stretched over a convex-spherical image support is located in the image plane of the mirror.

It is necessary that light shall not enter from the exterior into the space intended for the optical rays producing the photograph. For this purpose, said space is enclosed by a housing which is closed in a light-tight manner and which exhibits an aperture to allow of introducing and removing the cassette. A mechanism operated from the exterior and arranged inside the housing may serve to move the cassette in the direction of the optical axis. It is undesirable and would cause damage to the adapting surfaces if efforts would be made to re- move the cassette while pressure is exerted upon it in the direction of the optical axis. The device may be of a design such that the position of the member for operating the mechanism indicates whether the cassette occupies the position intended for taking a photograph or has been released by the pressure mechanism. According to a further feature of the invention, the said member controls a locking device which in the first-mentioned case prevents the cassette from being shifted at right angles to the optical axis.

In order that the invention may be readily carried into effect, it will now be described with reference to the accompanying drawing, given by way of example, in which
 Fig. 1 shows the cassette, as viewed from the back,
 Fig. 2 shows the cassette in plan view, and
 Fig. 3 shows the cassette from the side and partly in section.
 Fig. 4 shows diagrammatically in section the embodiment according to the invention in which the cassette occupies the required position in the optical mirror system.

Referring more particularly to the drawing the cassette is substantially constituted by an elongated flat box having a bottom and upright walls. The cover is constituted by a slide 1 which can slide in a groove 4 provided in each of side-walls 2 and 3 and which, when wholly moved inwards, fits with its end into a groove 5 of an end wall 6.

A square aperture 8 is recessed in the bottom 7 of the cassette, so that the space enclosed between the walls 2, 3 and 6 is accessible from the front and the backside after the slide 1 has been removed. The fourth side is likewise bounded by a transverse wall. Said space has introduced into it the photo-sensitive plate or film 9 which is required to be photo-sensitive on the side adjacent the slide 1 and accessible to the image-producing rays. The aperture admitting the said rays is bounded by a frame 10 and is smaller than the recess provided in the bottom. The photo-sensitive plate or image layer 9 is clamped in position against the frame 10 by means of a support 11 which from the bottom side is positioned in the aperture and subsequently urged by means of a screw 12 which is screwed in a small plate 13, which is slightly curved in shape and comprises four tongues 14. The plate 13 is introduced into the aperture 8 with its tongues directed in a diagonal manner and subsequently turned through a 45° angle, the tongues each engaging in a groove 15 provided in each of the side walls. Upon tightening the screw 12 by means of a flat knob 16, the support 11 is urged against the frame 10, thus clamping the photo-sensitive plate 9 in position.

The image plane of an optical mirror system of which a reduced image is to be produced is a spherically-curved plane when using a plane luminescent screen. That surface of the pressure table 11 which is adjacent the mirror is curved similarly, as well as the edge of the frame 10, which serves as a supporting surface. The image layer 9 thus also assumes the spherical shape.

The cassette is introduced into the mirror camera from the side. The camera is shown diagrammatically in Fig. 4 and comprises a housing 17, for example cylindrical in shape, in one end of which a concave mirror 18 is arranged. The securing of the mirror in the housing is disregarded here for it forms no part of the present invention.

At the other end of the housing there is arranged a luminescent screen (not shown) on which the X-ray image appears which serves as the object for taking the photograph, and furthermore provision being made of the correcting plate which is likewise located at the left-hand side of the image plane of the mirror.

The image plane of the mirror 18 is required to coincide with the surface of the image layer 9 stretched over the pressure table 11. The adjustment requires utmost accuracy. If the cassette would merely be guided through an aperture in the housing 17, it is very likely after taking a limited number of photographs that the quality of the image is noticeably affected already by some wear and tear resulting from the fact that for replacing the image layer the cassette is required to be moved into the camera and out of it for each photograph. In the arrangement according to the invention, the cassette passes through the aperture in the camera wall with a liberal amount of play and moves in guide paths which permit of a small displacement of the cassette in the direction of the optical axis. Correct positioning is achieved by urging the cassette with its adapting surfaces against fixed points of support 20.

The cassette comprises three cams 21 each having a surface 22 which is either located in the spherical plane in which the image layer 9 is curved (Figs. 1, 2 and 3) or forms part of a surface which is concentrical therewith. The radius of curvature is preferably equal to that of the curvature of the image plane, so that the adapting surfaces and the edge of the frame 10 against which the image layer 9 is clamped in position by the support 11 can be treated simultaneously. For this purpose the frame 10 and the cams 21 are made in one piece which is united with the cassette afterwards.

Fig. 4 shows the mechanism urging the cassette into its operative position against the points of support 20, and that the inner side of the housing 17 exhibits a thickened part 23 which merges into an upright wall 24. The wall 24 exhibits three lugs 25 in which the supporting members 20 are secured. The thickened part 23 exhibits a rectangular aperture 26 to allow passage of the cassette and which, after the cassette has been introduced, is closed from the exterior in a light-tight manner by means of a covering plate 27 in cooperation with a closing edge 28, for example of felt. The cassette is urged against an abutment 29 and subsequently moved into the operative position. The mechanism which serves thereto comprises a U-shaped catch 30, of which one side 31 is slotted. The screw 12 slides into the slot when the cassette is introduced, the knob 16 then being embraced by the catch 30. The latter is pushed to the right against the force of a spring 32 by means of a cam 33 provided on a shaft 34 which projects to the exterior through an aperture of the thickened part 23. The shaft 34 is provided with a handle 35 which in the position shown is directed backwards. Turning the handle by a quarter of a stroke so as to occupy the position shown in dotted lines causes the cam 33 to slide from under the catch 30. The catch is then moved to the left by the force of spring 32 which is captured between the wall 24 and a nut 36 on a pin 37 connected to the catch 30. The catch 30 takes along the cassette until the adapting surfaces 22 engage the supporting members 20. The cassette cannot then be removed since the handle 35 slides over a handle 38 provided on the covering plate 27.

For removing the cassette the shaft 34 is turned back by means of the handle 35, so that the cam 33 pushes the catch 30 to the right and the cassette is released from the points of support. Consequently, wear and tear of the said points and the adapting surfaces resulting from sliding the cassette in and out cannot occur, so that it is always certain that the image-producing layer occupies the correct position required with respect to the mirror.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. An X-ray photography device comprising a housing, an optical mirror system in said housing, a cassette, a closable opening in said housing having spaced supports therein and guide members adjacent to said opening, an image producing layer in said cassette, said cassette adapted to be moved into and out of said housing through said opening and between said guide members and at right angles to the optical axis of said device, at least three extensions provided on said cassette, said extensions being in the spherical image plane of said optical mirror system, and means in said housing for shifting said cassette in the direction of the optical axis whereby said extensions are urged against said supports and the image producing layer is placed in the correct position for taking a photograph.

2. An X-ray photography device as claimed in claim 1 wherein said fixed supports are pointed at their contact ends.

3. An X-ray photography device as claimed in claim 1 wherein said means for shifting said cassette in the direction of the optical axis includes a member having part thereof projecting through a wall of said housing in a light-tight manner, a spring-biased retaining element, said member upon being moved in one direction for actuating said retaining element to releasably secure said cassette and to prevent the latter from being shifted at right angles to said optical axis and when moved in another direction said member releases said retaining element and removes said extensions of said cassette from engagement with said fixed supports.

References Cited in the file of this patent

UNITED STATES PATENTS

| | | |
|---|---|---|
| 694,920 | Houston | Mar. 4, 1902 |
| 1,222,310 | Lichtman | Apr. 10, 1917 |
| 1,347,824 | Pifer | July 27, 1920 |
| 2,433,613 | Little | Dec. 30, 1947 |
| 2,503,661 | Fassin | Apr. 11, 1950 |
| 2,506,907 | Smith et al. | May 9, 1950 |
| 2,731,893 | Kling et al. | Jan. 24, 1956 |

FOREIGN PATENTS

| | | |
|---|---|---|
| 17,835 | Great Britain | of 1898 |

OTHER REFERENCES

The British Journal of Photography, vol. XCVII, No. 4704, July 14, 1950, pp. 364 and 365 cited.